United States Patent [19]

Shiota

[11] Patent Number: 5,134,928
[45] Date of Patent: Aug. 4, 1992

[54] PEELING ROLLERS FOR VEGETABLES

[76] Inventor: Tomekazu Shiota, 7-4, Ebie 7-chome, Fukushima-ku, Osaka-shi, Osaka 553, Japan

[21] Appl. No.: 624,138

[22] Filed: Dec. 7, 1990

[51] Int. Cl.⁵ .......................... A23N 5/00; B02B 3/04
[52] U.S. Cl. ........................................ 99/620; 99/574; 99/617; 99/618; 99/621; 29/121.1; 29/121.8; 29/123; 29/132; 51/358; 51/373
[58] Field of Search .................. 99/540, 541, 617–620, 99/623, 624, 625, 626, 628, 585; 69/42, 43; 15/3.17; 29/121.8, 121.1, 123, 132, 126; 51/373, 372, 80 R, 381, 358, 357; 100/121, 176

[56] References Cited

U.S. PATENT DOCUMENTS

| 1,444,314 | 2/1923 | Herder | 51/373 |
| 2,326,356 | 8/1943 | Haslam | 99/626 |
| 2,593,158 | 4/1952 | Lorig | 29/121.1 |
| 3,156,276 | 11/1964 | Petrella et al. | 99/623 |
| 3,515,188 | 6/1970 | Morikawa et al. | 99/585 |
| 3,969,802 | 7/1976 | Bouvet | 100/121 |
| 3,999,038 | 12/1976 | Sikes, Jr. et al. | 100/176 |
| 4,040,157 | 8/1977 | Shanly | 29/123 |
| 4,316,314 | 2/1982 | Shlykov et al. | 29/123 |
| 4,662,274 | 5/1987 | Nonomiya et al. | 99/617 |
| 4,897,968 | 2/1990 | Hutt | 51/373 |

FOREIGN PATENT DOCUMENTS

| 456642 | 2/1928 | Fed. Rep. of Germany | 99/626 |
| 45-37479 | 11/1970 | Japan | 99/626 |
| 2166940 | 5/1986 | United Kingdom | 99/540 |

Primary Examiner—Timothy F. Simone
Attorney, Agent, or Firm—Flynn, Thiel, Boutell & Tanis

[57] ABSTRACT

Peeling rollers for vegetables, particularly root crops each comprising an hourglass-shaped core roller having a recessed portion defined and an outer cylindrical elastomer member concentrically surrounding the core roller, thereby constituting a space enclosed by the recessed portion and the elastomer member, the elastomer member being attached with abrasive pieces, the space being a hollow.

4 Claims, 3 Drawing Sheets

PEELING ROLLERS FOR VEGETABLES

BACKGROUND OF THE INVENTION

1. Field of the Invention

This invention relates to peeling rollers used for peeling and stripping epidermises of root crops or other elongate vegetables such as carrots, radishes, burdocks, etc. at high speed and smoothly. More particularly, this invention is concerned with a pair of peeling rollers for use in a peeling apparatus of a type in which the peeling rollers are disposed in parallel with each other and driven to revolve in mutually opposite directions and, when an objective material to be treated is inserted between them, serve to abrade or scrape the epidermis of it as well as soil and mire attached.

2. Statement of Related Art

In the peeling work of various elongate vegetables whose edible parts are grown in the soil, manual work of a worker has been conducted with the aid of a knife or any simple peeling tool, after removal of the soil and mud therefrom. Particularly where they are treated in large quantities, such manual work not only has caused deterioration of the working environment, contamination to the worker him- or herself, and fatigue and exhaustion at his or her various body parts which may eventually affect adversely on the health, but also has had a tendency of peeling epidermises of the vegetables toward being stripped too much or being stripped unevenly, which has led to reduction in efficiency and yield.

In order to eliminate the drawbacks of peeling treatment by manual work, various peeling machines are provided and known, for example, one comprising a pair of rollers equipped with brushes on their surfaces. With this peeling machine, however, as a peeling work progresses, soil and mire attached to an objective material enter the brushes to accumulate therein and peeling dusts also accumulate in the brushes while the brushes are worn off, impaired and deformed, with the result that the peeling work becomes substantially inoperable or peeling efficiency is significantly decreased.

The present inventor has already proposed several peeling devices equipped with cylindrical rollers based on peeling action of abrasion or scraping, in view of the defects in the existing peeling machines. The peeling rollers are each formed of an hourglass-shaped roller core, an outer elastomer member surrounding concentrically the core which member is attached thereon with granulate abrasive pieces, the elastomer member consisting of a plurality of plate-like pieces, and a damper of elastomer foam filling the space enclosed by a recessed portion of the core and the elastomer member, whereby elasticity or pliability of the elastomer member and the damper induced by centrifugal force upon high speed revolution and abrasion action of the abrasive material are exploited.

These solid type peeling devices are operated so that by the revolution of the hourglass-shaped core rollers, the elastomer members attached with the abrasive pieces press against and abrade the surface of a material to be treated, and consequently, have the advantages that the treating time is substantially shortened as compared with conventional peeling devices and homogeneous peeling over the whole surface of the treating material is possible. When the peeling rollers are revolved at high speed, however, a problem frequently occurs owing to the fact that the foam gradually absorbs water rather than functioning as a damper. That is, because of the absorption of water in the foam, the rollers distend in their central areas to assume a barrel form, as a result of which, in an extreme case, the rollers come into contact with each other in their outer circumferences of the central areas owing to the centrifugal force and the abrasive granules are detached to scatter, causing ultimately even breakdown of the rollers. Even in a non-extreme case, it is not possible to treat the surface of the material homogeneously and the surface areas of the peeling rollers which can partake of the treatment are decreased, which runs into the reduction in peeling efficiency. Thus, they have yet remained to be improved.

The inventor has investigated further into the foregoing problems to avoid the phenomenon that the rollers are distended in barrel form upon revolution, and found that the problems can be solved unexpectedly by constituting the space enclosed between the outer elastomer member of cylindrical body and the recessed portion of the core roller as a hollow.

SUMMARY OF THE INVENTION

Accordingly, a primary object of this invention is to provide peeling rollers for vegetables which permit a high-speed and homogeneous peeling without causing barrel form distension phenomenon.

A secondary object of this invention is to provide peeling rollers which can conform or fit pliably to the profiles of vegetables to be treated and, after peeling, permit to retain their natural profiles or appearances with no excessive peeling.

The present invention for attaining the objects consists in peeling rollers for vegetables which comprise each an hourglass-shaped core roller having a recessed portion in its central area and an outer cylindrical elastomer member concentrically surrounding the core roller, thereby constituting a space enclosed by the recessed portion and the elastomer member, the space being a hollow, the elastomer member being attached with a plurality of abrasive pieces thereon.

According to a preferred embodiment of this invention, the cylindrical elastomer member is composed of a plurality of elastomer plates each consisting of a base portion and a joint portion, all the base portions being joined together circumferentially to form a cylindrical body and all the joint portions extending in the hollow and being connected to the recessed portion.

According to another embodiment, the elastomer member is formed of a single cylindrical body having both peripheral portions which are folded down on the core roller at both ends, the peripheral portions being defined with a plurality of openings for drainage of water.

Examples of this invention will be hereinafter described in more detail with reference to the accompanying drawings.

DESCRIPTION OF PREFERRED EMBODIMENTS

Figure 1:
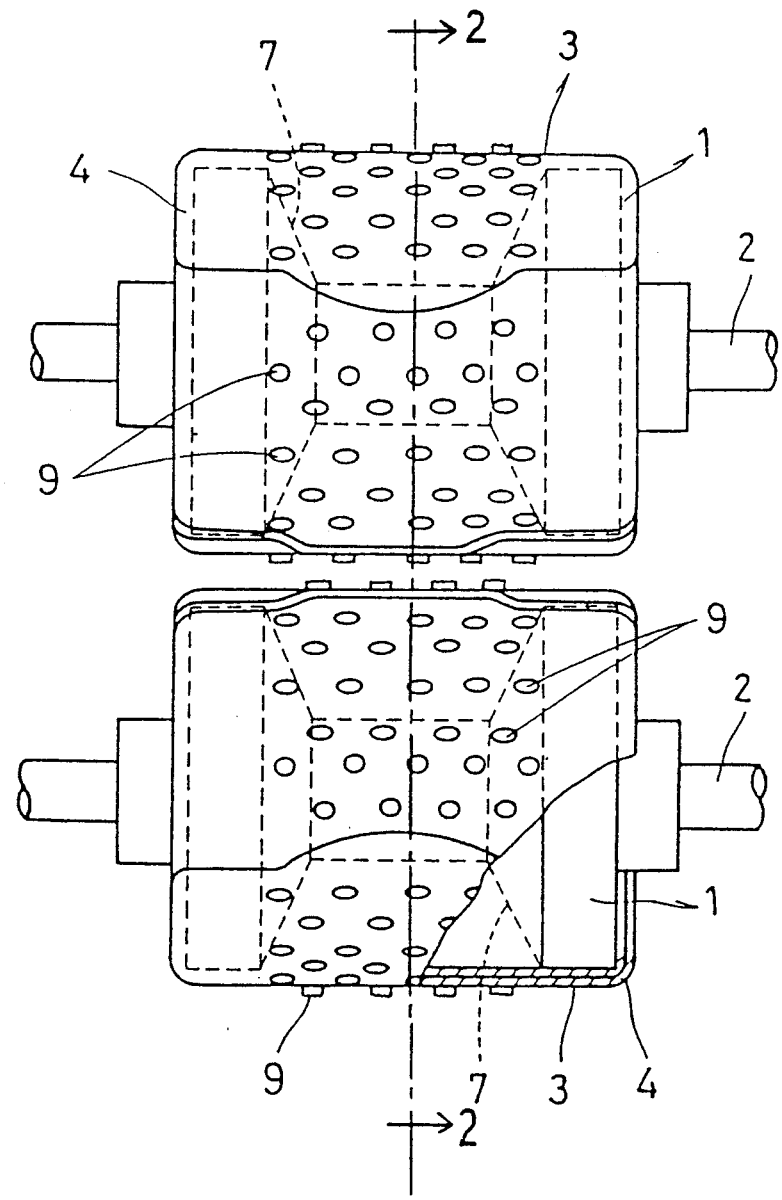
FIG. 1 is a schematic elevational view of one example of peeling rollers according to this invention.
Figure 2:
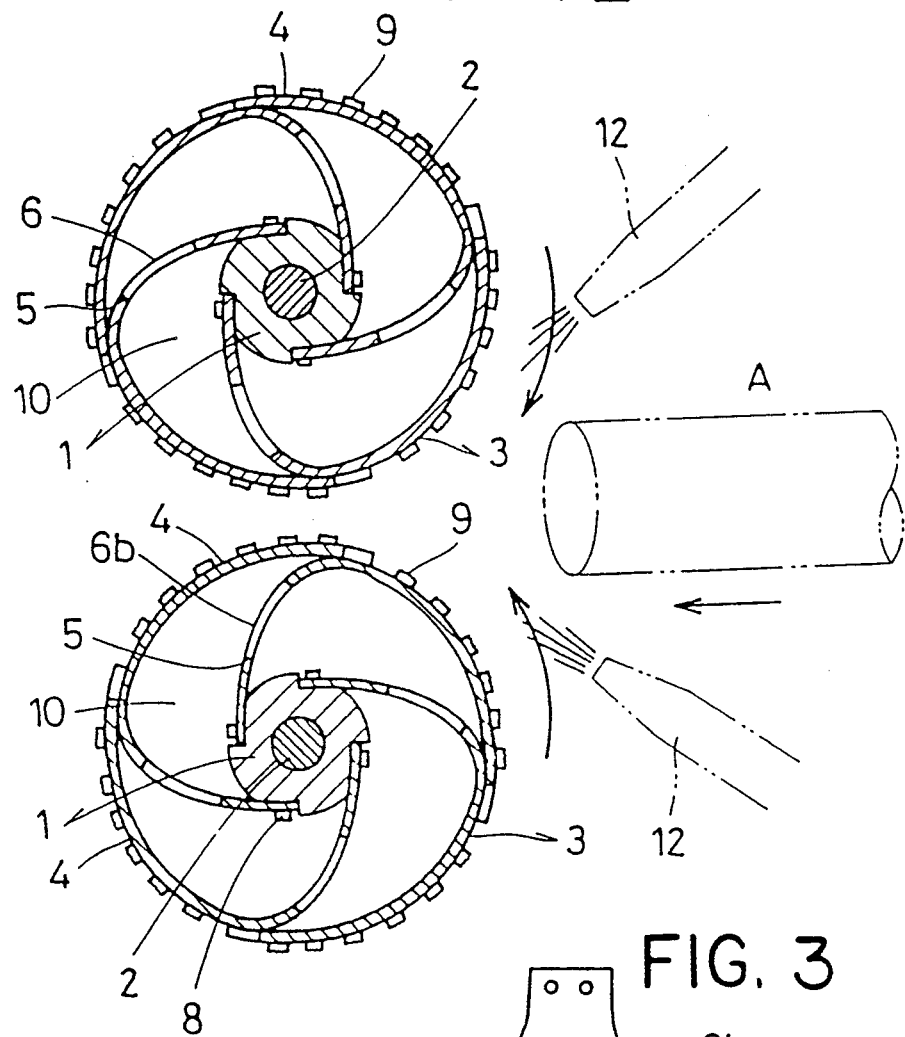
FIG. 2 is a schematic side cross-sectional view of the peeling rollers taken along the line 2—2 in FIG. 1.
Figure 3:
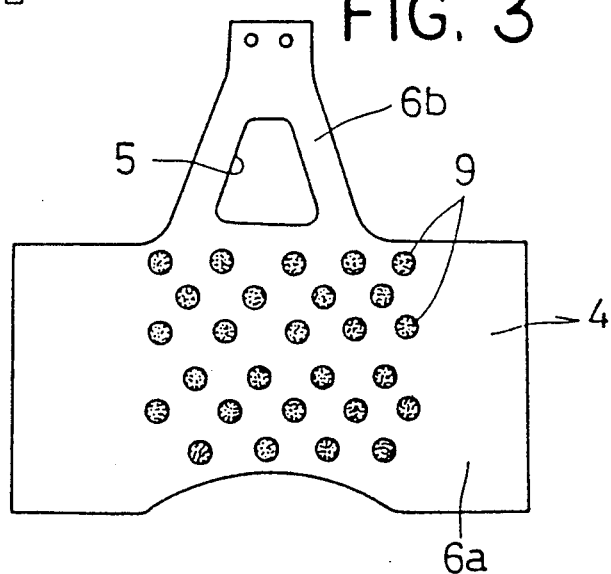
FIG. 3 is a plan view of an elastomer plate constituting a part of an elastomer member which is a component of the peeling rollers.

According to one example in FIGS. 1 to 3, a pair of peeling rollers for use in a peeling device (not shown) are illustrated. The reference numerals 1, 1 designate a pair of hourglass-shaped core rollers defined with recessed portions 7, 7 in their central areas, which rollers form a main body of the peeling rollers. A pair of the core rollers 1, 1 are disposed in parallel to each other with their shafts 2, 2 spaced apart a required distance and rest on the shafts so as to be revolvable in opposite directions. The rotary shafts 2, 2 are supported so that the distance therebetween may be adjusted to accommodate the thickness of a material A such as a carrot, radish, etc. to be passed between the rollers.

The maximum outside diameter of the core roller 1 varies depending on the thickness of a material A to be treated, but usually is in the range of 60 to 30 mm.

The reference numeral 3 designates a cylindrical elastomer member that concentrically surrounds whole cylindrical circumference of the core roller 1 and peripheral portions on both sides. The elastomer member 3 is composed of a plurality of elatomer plates 4 connected together in the radial direction of the core roller, and each elastomer plate 4 is formed of a rectangular base portion 6a and a triangular joint portion 6b. The base portions 6a are joined together in their longer sides by adhesive bonding, etc. to form a cylinder body while the joint portions 6b are releasably secured in their tops to the bottom portion 7a of the recessed portion 7 through a fastening device 8 such as vises.

The triangular joint portion 6b is apertured with a window hole 5 in its central part so that when the elastomer plates 4 are jointly formed into the integral cylindrical elastomer member 3, the holes may communicate with one another.

The elastomer plate 4 is fabricated by blanking of a material having elasticity, water resistance and corrosion resistance such as natural rubber or synthetic rubber. In the base portion 6a to be exposed as the outer circumference of the peeling roller, a plurality of small pieces 9 of abrasive material in a circle form are attached on the surface.

When a plural number of the elastomer plates 4 (four pieces in the illustrated example) are joined together circumferentially, the elastomer member 3 in a cylinder form is obtained, having abrasive pieces 9 distributed on the surface thereof.

The space enclosed by the elastomer member 3 and the recessed portion 7 of the core roller 1 is a hollow 10, which is an essential requisite of this invention.

The small circular pieces of abrasive material 9 are obtained by punching a general sand paper or other abrasive papers or cloths, and aligned on and bonded to the surface of each elastomer plate 4. The shape of the abrasive material 9 is not limited to a circle, but a rectangular, elliptical, triangular or other shapes are possible. It is effective in improving the peeled surface of the material after treatment that the abrasive pieces are disposed and distributed evenly over the whole surface of the elastomer member 3.

Figure 4:
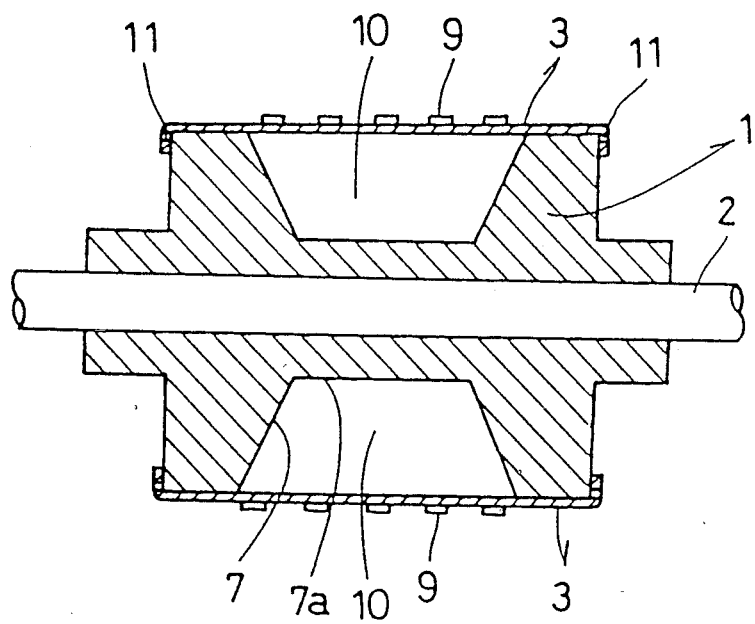
FIG. 4 is a cross-sectional view of a peeling roller according to another example of this invention.

Another preferred example of peeling rollers is shown in FIG. 4, wherein the cylindrical elastomer member 3 is of a single molded article in cylindrical form, for example, a rubber tube. Preferably, the rubber is composed substantially of natural rubber which has both pliability and elasticity.

The use of the flexible natural rubber as a single cylindrical molded article 3 in peeling rollers is advantageous in that when a vegetable such as root crops is peeled with the peeling rollers, the rollers are easily conformed to the profile of the object because suppleness and flexibility as well as elasticity suited to the material of the object are obtained. As a consequence, the peeling rate is increased and peeling work is enabled without impairing the the natural shape of the object, so that the yield is enhanced and a natural-looking peeled object is ultimately available.

The thickness of the single cylindrical molded article 3 such as natural rubber tube varies depending upon the thickness of a material to be treated, but is preferred to be in the range of 2 to 3 mm. When the thickness exceeds over this range, the flexibility will be too small for the single ealstomer member 3 to conform sufficiently to the treating material.

In both peripheral portions in folded-down form of the single cylindrical molded body 3, a plurality of openings 11 are apertured and serve to drain cleaning water entering into the hollow 10.

The application of the single cylindrical elastomer member 3 to the core roller 1 is carried out by providing a cylindrical rubber sheet having a longer axial length than the core roller 1, surrounding the rubber tube around the cylinder part of the core roller 1 with both peripheral portions of it overhung both ends of the core roller, and folding both overhanging portions down onto both circle portions at both ends, followed by anchoring or adhering. In the folded-down peripheral portions, a plurality of drainage holes 11 are apertured.

The operation of the peeling rollers of this invention when used in a peeling device will be hereinafter described with reference to FIG. 2.

When a pair of the hourglass-shaped core rollers 1,1 are revolved mutually in reverse directions with the recessed portions 7, 7 opposed, the cylindrical elastomer members 3,3 encircling the core rollers 1,1 are rotated while being tugged by the action of the joint portions 6b, integrally in the same revolution directions as the core rollers and slightly distend in the radial directions by the centrifugal force, as a result of which the cylindrical elastomer members 3,3 on the core rollers 1,1 are energized in the mutually approaching directions.

In that state, when a vegetable material A to be treated is inserted, at its one end, between the peeling rollers, while its other end is supported by grasping with a hand of a worker, the elastomer members 3,3 are curved along the configuration of the material while flexing inwardly toward the hollows 10,10 and moderately make pressure contact with the material on their outer circumferences. Thus, peeling action is performed by means of the abrasive pieces 9,9 on the elastomer members 3,3 simultaneously with removal of soil and mud attached on the material.

Since the abrasive pieces 9,9 abrade continuously the treating material along its longitudinal direction, the material is inserted and retracted repeatedly a few times, and resulting peeled epidermises are separated out in fine pieces or pulp mass.

When the peeling work is finished at the one end side of the material, the other end side of it which is untreated is likewise worked with the treated one end side grasped with a hand. The peeling work is thus finished in the overall part of the material.

In this way, it is possible to efficiently peel the material A in its all epidermis portions extending from its thick portion to a top thin portion.

In the treatment of vegetable materials attached with soil and mud, it is possible to spray water onto them through water jet nozzles 12, 12 disposed adjacent to the inlet location of the peeling rollers thereby to remove the soil and mud and peeling dusts, as shown in two dot-dash lines in FIG. 2. This permits easy working without contaminating the working environment.

The peeling rollers of this invention have the following advantages as compared with known peeling rollers:

(1) By the combination of the cylindrical elastomer member and the hollow as an air spring, elasticity and flexibility are obtained and consequently, it is possible to press the surfaces of the peeling rollers flexibly onto the surface of a vegetable material to be treated and to snugly fit the peeling rollers to the material. Even if each material has a lengthwise uneven thickness, or whatever thickness each material has, the peeling rollers can accommodate the dimensional variety whereby the peeling work of the material under homogeneous pressure contact is permitted.

(2) The construction of the hollow permits the peeling rollers to retain their cylindrical form, upon revolution at high speed, without distending in a barrel form, and hence, smooth, efficient peeling can be performed.

(3) Since the peeling rollers can be fit and conformed well to the contour of a material, surface abrasion by means of the abrasive pieces on their surfaces can be conducted securely. As a consequence, no waste peeling occurs and peeling yield is enhanced. Further, the material is advantageously finished in its natural shape.

(4) Because of the foregoing advantages in combination, workability with the peeling rollers is enhanced fatigue of workers is significantly lessened, and peeling efficiency is substantially increased.

(5) Since the space between the elastomer member and the recessed portion of the core roller is contrived as a hollow, the assembly of the peeling rollers is simplified and the assembly cost is also curtailed.

What is claimed is:

1. Peeling rollers for peeling and stripping epidermises of vegetables, comprising a pair of hourglass-shaped cylindrical core rollers, each said roller having an axially central area and means defining an annular recessed portion at said axially central area, each said roller further having an outer cylindrical elastomer member concentrically surrounding an outer circumference of said core roller and said annular recessed portion, thereby constituting a space enclosed by said annular recessed portion and said elastomer member, said space being a void, said elastomer member having an outer face to which a plurality of abrasive pieces are attached, said elastomer member being composed of a plurality of elastomer plates each comprising a base portion and a joint portion, said base portions conjointly forming an external cylindrical body encircling said core roller, said joint portions extending from said base portions internally of each said peeling roller into said void and said annular recessed portions whereat said joint portions are secured to said core rollers.

2. Peeling rollers for peeling and stripping epidermises of vegetables, comprising a pair of hourglass-shaped cylindrical core rollers, each said roller having an axially central area and means defining an annular recessed portion at said axially central area, each said roller further having an outer cylindrical elastomer member concentrically surrounding an outer circumference of said core roller and said annular recessed portion, thereby constituting a space enclosed by said annular recessed portion and said elastomer member, said space being a void, said elastomer member having an outer face to which a plurality of abrasive pieces are attached, said cylindrical elastomer member being of a single molded article and comprises a cylindrical body having axial end portions folded over axial ends of said core rollers at both ends, said axial end portions having means defining a plurality of openings for drainage.

3. The peeling rollers as set forth in claim 2, wherein said cylindrical elastomer member is made substantially of a natural rubber having flexibility and elasticity.

4. The peeling rollers as set forth in claim 3, wherein said cylindrical elastomer member is a rubber tube of 2 to 3 mm in thickness.

* * * * *